(12) United States Patent
Znidarsic

(10) Patent No.: US 7,849,017 B2
(45) Date of Patent: Dec. 7, 2010

(54) ENFORCED SEAT-BASED LICENSING

(75) Inventor: David Znidarsic, Palo Alto, CA (US)

(73) Assignee: Flexera Software, Inc., Schaumburg, IL (US)

( * ) Notice: Subject to any disclaimer, the term of this patent is extended or adjusted under 35 U.S.C. 154(b) by 602 days.

(21) Appl. No.: 11/427,539

(22) Filed: Jun. 29, 2006

(65) Prior Publication Data

US 2008/0005032 A1 Jan. 3, 2008

(51) Int. Cl.
*G06F 21/00* (2006.01)
(52) U.S. Cl. ...................................... 705/59
(58) Field of Classification Search .............. 705/59
See application file for complete search history.

(56) References Cited

U.S. PATENT DOCUMENTS

| | | | |
|---|---|---|---|
| 6,009,401 A | | 12/1999 | Horstmann |
| 2005/0049973 A1* | 3/2005 | Read et al. ................... 705/59 |
| 2005/0216548 A1 | 9/2005 | Wormington et al. |
| 2006/0004667 A1 | 1/2006 | Neil |
| 2006/0136343 A1 | 6/2006 | Coley et al. |
| 2007/0073623 A1* | 3/2007 | Phelps ......................... 705/51 |
| 2007/0239616 A1* | 10/2007 | Walline et al. ................. 705/59 |
| 2008/0005787 A1* | 1/2008 | Aldred ........................... 726/4 |
| 2008/0159540 A1* | 7/2008 | Maetz et al. ................. 380/277 |
| 2009/0098936 A1* | 4/2009 | Lawrence et al. ............. 463/29 |
| 2009/0299791 A1* | 12/2009 | Blake et al. .................... 705/8 |
| 2010/0107258 A1* | 4/2010 | Park et al. .................... 726/26 |

FOREIGN PATENT DOCUMENTS

WO WO 2006036906 A2 6/2006
WO PCT/US2007/071993 12/2007

OTHER PUBLICATIONS

European Search Report, EP 07 79 8983, Jul. 6, 2009.

* cited by examiner

*Primary Examiner*—Pierre E Elisca
(74) *Attorney, Agent, or Firm*—Orrick, Herrington & Sutcliffe, LLP

(57) ABSTRACT

A method and system for enforcing seat-based licensing is disclosed. According to one embodiment, a license server stores a license count, a value which indicates how many licenses are available for a particular software application. At installation, an installation launcher queries the license server to determine if a license is available for the software application. If a license is available, the software is installed and the license count is decreased. At uninstall, the license count is increased to free up a license for any system on the network. In this manner, a licensor or a system administrator may keep electronic records of software installations and of how many licenses are used. The methods and system also allow for automated enforcement of a seat-based licensing scheme.

14 Claims, 7 Drawing Sheets

ENFORCED SEAT-BASED LICENSING

FIELD OF THE INVENTION

The field of the invention relates generally to computer systems and more particularly relates to a method and system for enforcing seat-based licensing of software.

BACKGROUND OF THE INVENTION

Licensing arrangements for software are of two basic types: one type grants a user the right to use software a preset number of times and another type grants a user the right to install software a preset number of times. The latter type, based on how many times a user can install software, is called seat-based licensing.

There exist methods and applications for enforcing a license which grants a user the right to use software a preset number of times. Some such applications are embedded within the software being licensed, and essentially count the number of times the software is launched. Once this counter reaches the number of licenses granted, the software will be locked. Examples of such applications are FLEXlm, SafeCast, and FlexNet Publisher. U.S. Pat. No. 5,390,297 describes such methods and systems in more detail.

Enforcement of seat-based licensing schemes is primarily done by the end user. Where an individual purchases software and installs that software on just one system, no enforcement is necessary. However, oftentimes an enterprise purchases one install disk (or download) and a number of licenses for installation on a number of systems across the enterprise network. In this case, it is up to the system administrator of the enterprise to ensure that the enterprise does not install more copies of the software than were purchased. If the enterprise does install more copies than were purchased, there is no way for the licensor to know that the enterprise is in breach. Therefore, many software licensors have implemented varying levels of manual compliance-checking, which is a costly and time-consuming process for both the licensor and the enterprise.

Enterprises might have thousands of software titles, each installed on thousands of end-user systems. Because of the vast number of installations, manual compliance-checking may be unfeasible and inaccurate. Commercial software distribution tools do exist which control the number of systems to which the software is distributed. However, such tools only limit the number of copies distributed, not the number of copies installed. Software asset management tools exist which report the number of systems to which the software has been installed. However, such tools report this number post-install. Thus, they are only useful in reporting non-compliance, not preventing it.

A system administrator may want to know if the enterprise is installing fewer titles than were purchased. Software asset management tools may perform this function, but they do so by trolling the enterprise's network.

SUMMARY

A method and system for enforcing a seat-based licensing scheme is disclosed. A software component is distributed to an end user or enterprise which maintains a record of the number of copies of that software that is presently installed. Prior to installation of the licensed software, the system checks to see how many copies of that software are already installed in the enterprise. If that number is greater than the number of licenses, the user or system administrator is prohibited from installing the licensed software. If, on the other hand, there are remaining licenses, the licensed software is installed as in the ordinary course.

DETAILED DESCRIPTION

A method and system for enforcing a seat-based licensing scheme are disclosed. A license server stores information about the number of licenses available. Prior to software installation, a remote system queries the license server to ensure that the appropriate license is available. If there is no available license for the software being installed, the license server returns an indication that the software is not to be installed, and installation aborts. If there is a license available, the license count is decremented and the software is installed. If the installation aborts before successful completion, the license count is restored to its previous state by incrementing the count.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to: floppy disks, optical disks, CD-ROMs, and magnetic-optical disks, read-only memories (ROMs), random access memories (RAMs), EPROMs, EEPROMs, magnetic or optical cards, or any other type of media suitable for storing electronic instructions and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below.

Figure 1:
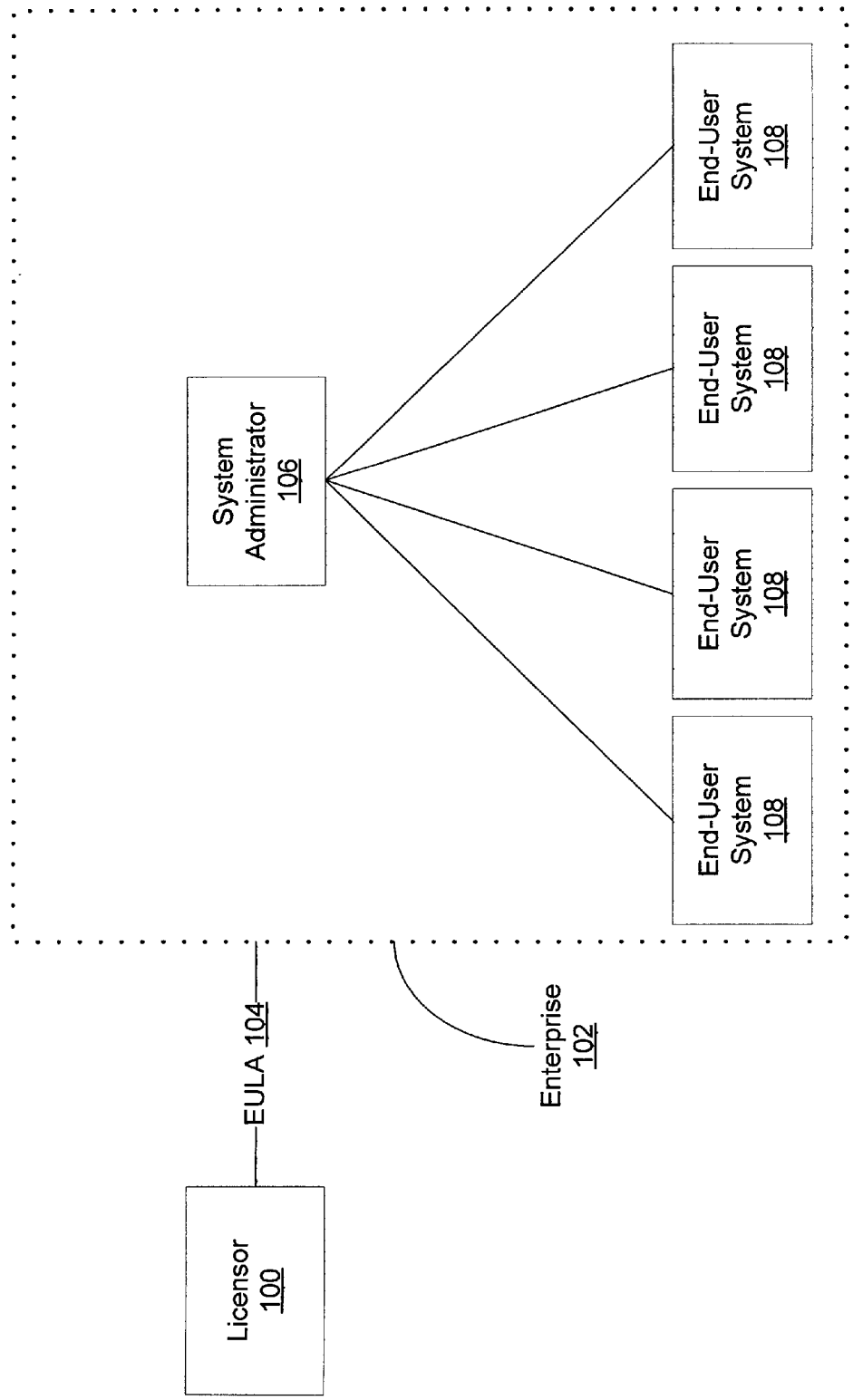
FIG. 1 illustrates a licensing system including a licensor and an enterprise, according to one embodiment of the present invention.

FIG. 1 illustrates a licensing system including a licensor 100, an enterprise 102, and a number of end-user systems 108. While an enterprise 102 is depicted, the ideas depicted herein are equally applicable to any other network such as an educational network, home network, etc. As shown, licensor 100 agrees upon terms of an End User License Agreement 104 with the enterprise 102. This Agreement 104 contains information about the number of licenses available to the enterprise, any restrictions on installation, and other related issues. The enterprise 102 has a system administrator 106, a person that installs the licensed software on each desired end-user system 108.

Figure 2:
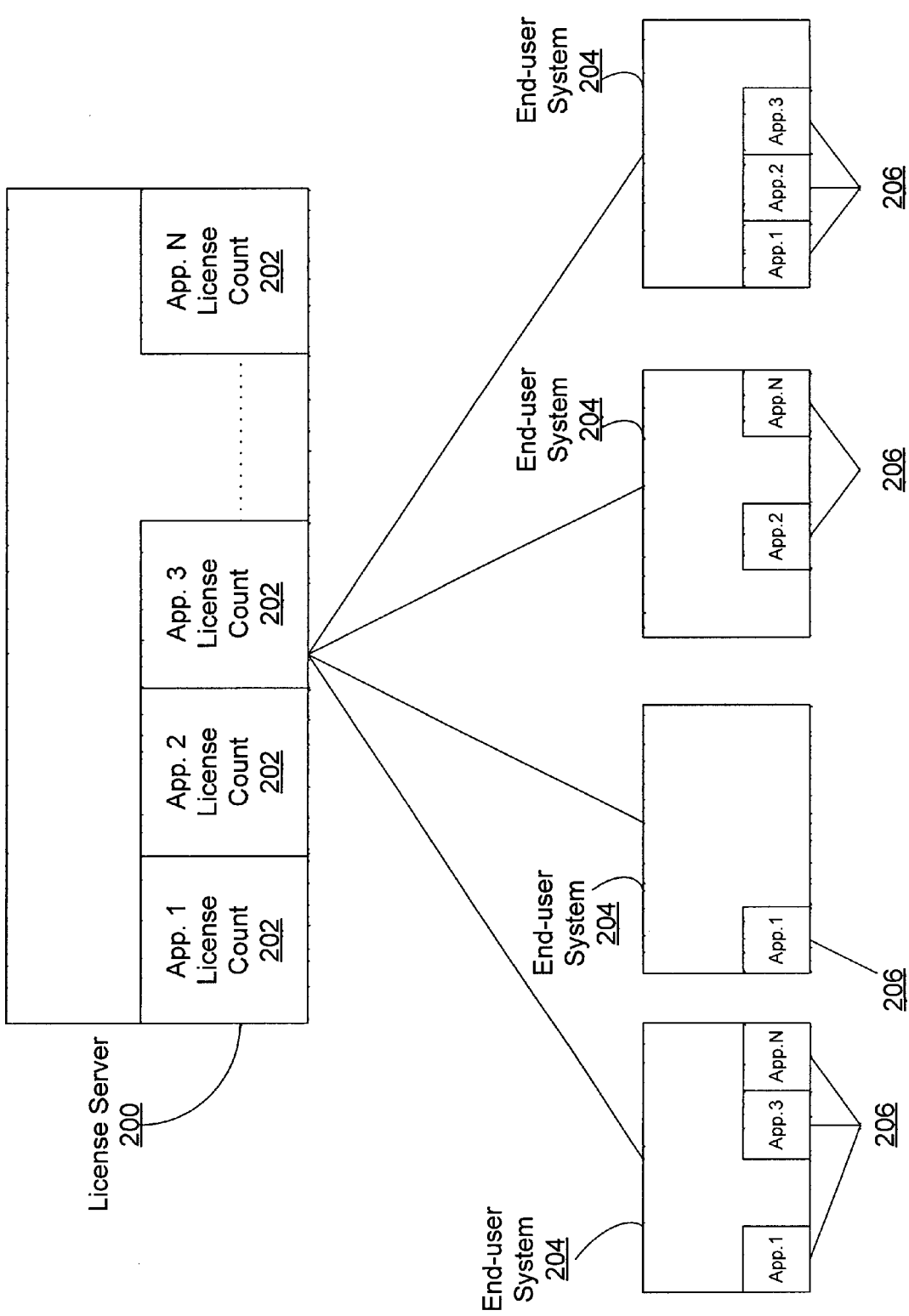
FIG. 2 illustrates a block diagram of an exemplary licensing system including a license server and end-user systems, according to one embodiment of the present invention.

FIG. 2 illustrates an exemplary arrangement of a license server 200 and end-user systems 204 according to the present disclosure. License server 200 administers and regulates licenses for applications installed on end-user systems 204. The license server 200 is connected to each end-user system 204, and the license server 200 and end-user systems 204 communicate with each other during installation or uninstallation of the software application. License server 200 contains a license count 202 for each licensed software application 206. The license count 202 indicates the number of available licenses for the associated software (e.g., for App. 1, App. 2 . . . App. N). The license server 200 communicates with each end-user system 204 via a communications protocol. The end-user systems 204 are any system capable of running the software application and having connectivity with the license server 200, including but not limited to: a PC, PDA, or a server system. According to the present disclosure, a license server 200 may store a license count 202 for multiple applications App. 1 through App. N. Each application does not need to be installed on each end-user's system 204, but the license count 202 is available to each end-user system 204. As depicted, each end-user system 204 has a unique assortment of software applications 206 (App. 1 through App. N), though there is no restriction as to what software applications are installed on which computers.

The license count 202 might be a number indicating how many licenses are available, or it might be a number indicating how many licenses are used with an additional value representing the total number of licenses available. Any other representation of license count 202 may be used, as long as the license server 200 stores (or can compute) the critical information—how many licenses are left.

Upon initiation of installation on an end-user system 204, the end-user system 204 notifies the license server 200 which application 206 is being installed, along with the version 308 and the manufacturer 310. The license server 200 verifies the license count 202 for that software application and informs the end-user system 204 whether a license is available or not. Depending on that information, the software application 206 is either installed on the end-user system 204 or not.

The license server 200 may be a computer within the same network as the end-user systems 204, or it might be located on a network administered by a licensor, such as licensor 100. In one embodiment, there might exist a single license server 200, administered by the licensor, storing information for all software installations worldwide. In another embodiment, each enterprise 102 administers its own license server 200.

In the embodiment where each enterprise 102 administers its own license server 200, the licensor 100 and the enterprise 102 might agree that the enterprise 102 share details of its license usage with the licensor 100. In this case, the license server 200 would be configured to periodically report the number of used (or available) licenses to the licensor 100. In this embodiment, the licensor 100 and the enterprise 102 set up an automatic debit account by which the enterprise 102 indicates to the licensor that it only used a certain number of its total licenses and, thus, should receive a refund if appropriate under the End User License Agreement 104. In yet another embodiment, the licensed software application is installed regardless of whether there are available licenses. In this embodiment, the license count is still updated. The license count is used by the licensor 100 to later bill the enterprise 102 for the appropriate number of licenses.

Figure 3:
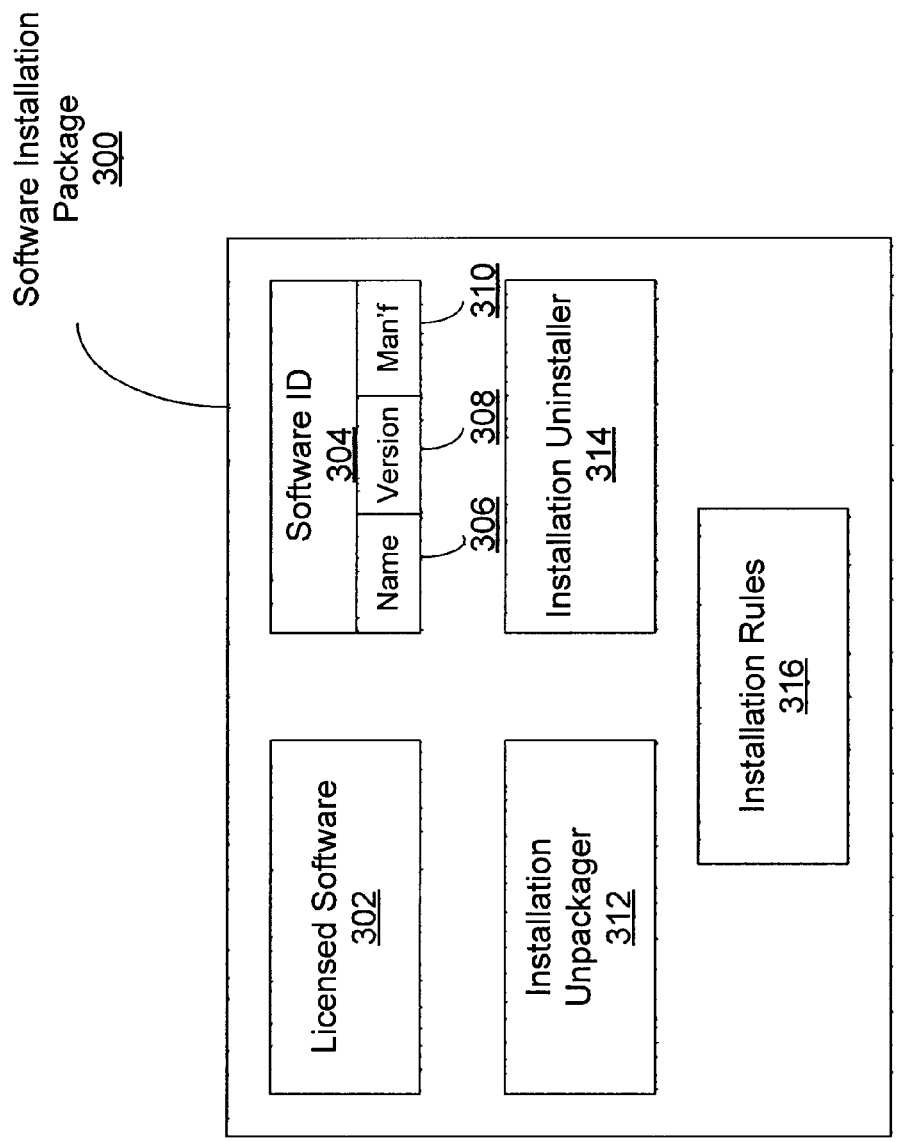
FIG. 3 illustrates a block diagram of an exemplary software installation package, according to one embodiment of the present invention.

FIG. 3 illustrates a block diagram of an exemplary software installation package 300, according to one embodiment of the present invention. The software installation package 300 is a software package that is distributed to the installer of the licensed software. The software installation package 300 is unpackaged and installed on one or more end-user systems 204, either by a system administrator 106 or by an end user. The package 300 contains five components: the licensed software 302, software ID 304, installation unpackager 312, installation uninstaller 314, and installation rules 316. The licensed software 302 includes the software application provided by a software vendor. The software ID 304 contains information about the licensed software 302. This information includes the software name 306, version 308, and manufacturer 310. The installation unpackager 312 and installation uninstaller 314 are optional components, and when used make installation (in the case of the installation unpackager 312) and uninstall (in the case of the installation uninstaller 314) easier. In an alternative embodiment, the installation unpackager 312 and installation uninstaller 314 may already be installed on a user system, as is the case when using Microsoft Windows Installer. The installation rules 316 provide the guidelines for installing the software on a system.

In one embodiment, the installation unpackager 312 and an installation uninstaller 314 are executed by a launcher on the end-user system 204, in the form of Microsoft Windows Installer or a comparable software package. In a different embodiment, the launcher 312 and uninstaller 314 are executed by a small launcher which resides in the software package 302. In yet another embodiment, the software package 302 contains a big launcher which includes installation launcher 312 and installation uninstaller 314.

Figure 4:
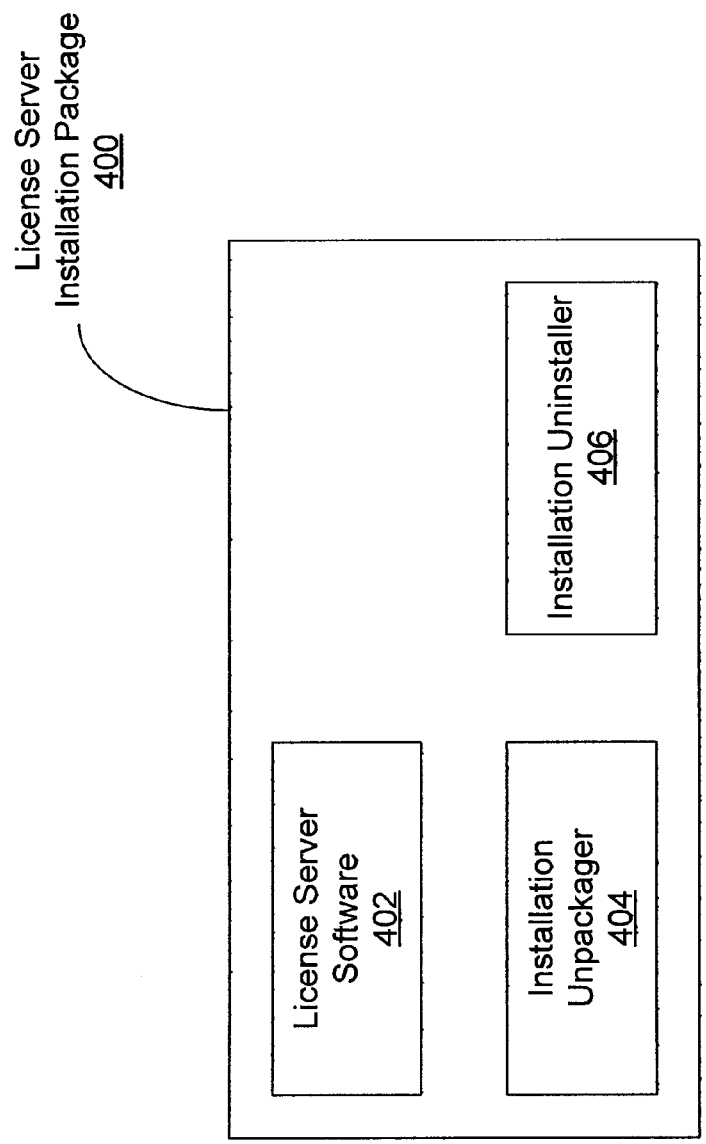
FIG. 4 illustrates a block diagram of an exemplary license server installation package, according to one embodiment of the present invention.

FIG. 4 illustrates a block diagram of an exemplary license server installation package 400, according to one embodiment of the present invention. This package is analogous to the software installation package 300, but resides on license server 200. The package 300 is installed by system administrator 106 on the license server 200. The package 400 contains license server software 402, an installation unpackager 404, and installation uninstaller 406. The license server software 402 is software which interacts with the software installation package 300 to store and provide information about available licenses. Installation unpackager 404 and installation uninstaller 406, akin to installation unpackager 312 and installation uninstaller 314, are optional components that make installation and uninstall easier.

Figure 5:
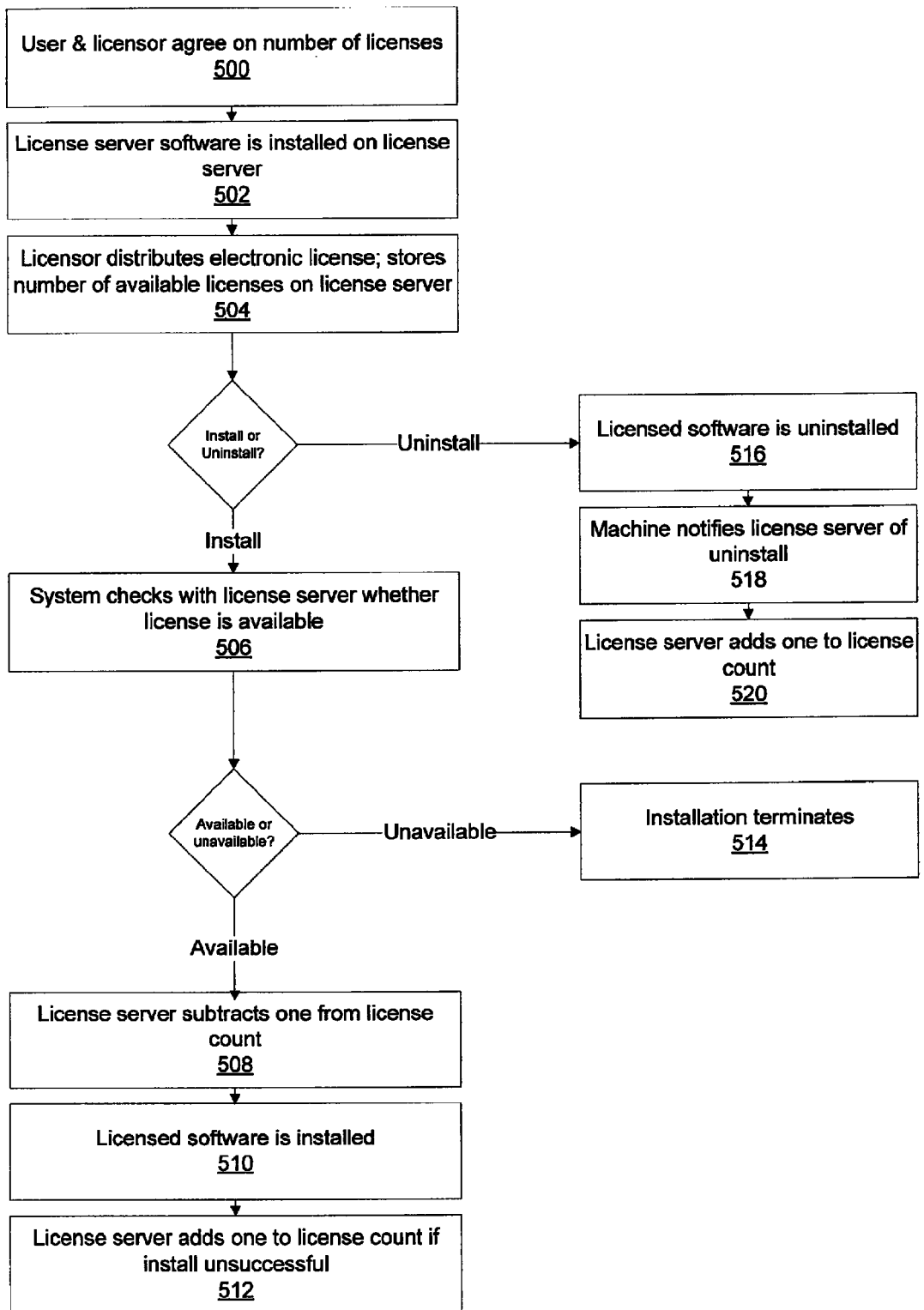
FIG. 5 illustrates a flow diagram of an exemplary seat-based licensing process, according to one embodiment of the present invention.

FIG. 5 illustrates a flow diagram of an exemplary enforced seat-based licensing process, according to one embodiment of the present invention. When a user (or an enterprise 102) and a licensor 100 enter into an End User License Agreement (500), license server software 402 is installed on a license server 200 (502). Once installed, the licensor 100 distributes an electronic license to the license server 200, which stores the number of available licenses for the appropriate software application (504). Once the license server software 402 is installed and license count created (504), a user on the network might attempt to install or uninstall any of the software applications covered by the license server 200.

When a user, either a system administrator or an end user, initiates installation of that software application, the system 204 checks with the license server 200 to determine whether a license is available (506). If no license is available or if the license server 200 does not respond with a positive indication that licenses are available, installation terminates and the user is prohibited from installing that software application (514). If a license is available, the license count 202 is decremented by one (508) and the licensed software 302 is installed (510). Once installation is completed, the system 204 reports back to the license server 200 whether installation was completed successfully or not. If the installation was unsuccessful, the license count 202 is incremented to restore the now unused license to the count 202 (512). The license server 200 also records the date, time, user name of the system administrator 106 or end user installing the software application, an identification of which system 204 requested the install of the software application, an indication of whether the request for a license was successful or not, and an indication of whether the installation was successful or not. This way, a report can be generated showing the installation activity on each system 204. In one embodiment, a user may wish to install the licensed software application on multiple systems 204. In this instance, essentially the same process is performed, only block (506) requires an end-user system 204 to request multiple licenses from the license server 200. This embodiment is configured such that only the number of licenses available are installed, or in another embodiment is configured such that no licenses will be installed unless all are available.

To maintain an accurate license count 202, a number of implementations may be employed. In the embodiment, the license count 202 is decremented prior to installation (508) and incremented if installation is unsuccessful. (512) In another embodiment, a temporary placeholder is set so that the license count 202 is not actually decremented prior to installation, but which prevents another system 204 from taking the last available license. In this arrangement, the license server 200 decrements the license count 202 once installation is completed successfully.

When a user initiates uninstall of a software application that has associated with it a license count, the licensed software application is uninstalled (516). Once uninstall is successful, the system from which the software application was uninstalled notifies the license server 200 of the software name, version, and manufacturer (518). The license server 200 then adds one to the license count 202 for that software application, thus freeing up a license (520). In one embodiment, a software application may be uninstalled while the system is not connected to the license server 200. In this embodiment, the end-user system 204 might store the information about which software, version, and manufacturer was uninstalled, and once the system does connect to the license server 200 that information is passed along to update the license count 202.

An end user installing applications over a network, such as the case in an enterprise 102 arrangement, may wish to internally enforce license restrictions. One may wish to do so in the instance where a licensor 100 does not enforce the End User License Agreement 104 but the end user wishes to stay in compliance. The end user repackages the licensed software using products such as Macrovision AdminStudio. After installing license server software 402 somewhere on its network, a user can use AdminStudio to add the query step 506 to the setup process to ensure that licenses are available before installing the software application.

In an alternative embodiment, the user may specify that he/she wishes to use a personal license as opposed to the enterprise's license. At initiation, the installation package will ask the user whether he/she wishes to use a personal license or the enterprises. The user then has the option to enter a license and bypass the step of checking with the license server (506). In this embodiment, the end-user system stores the information about which license is used, and upon uninstallation of the software application (516), block 520 is not performed because an enterprise license was not used.

Figure 6:
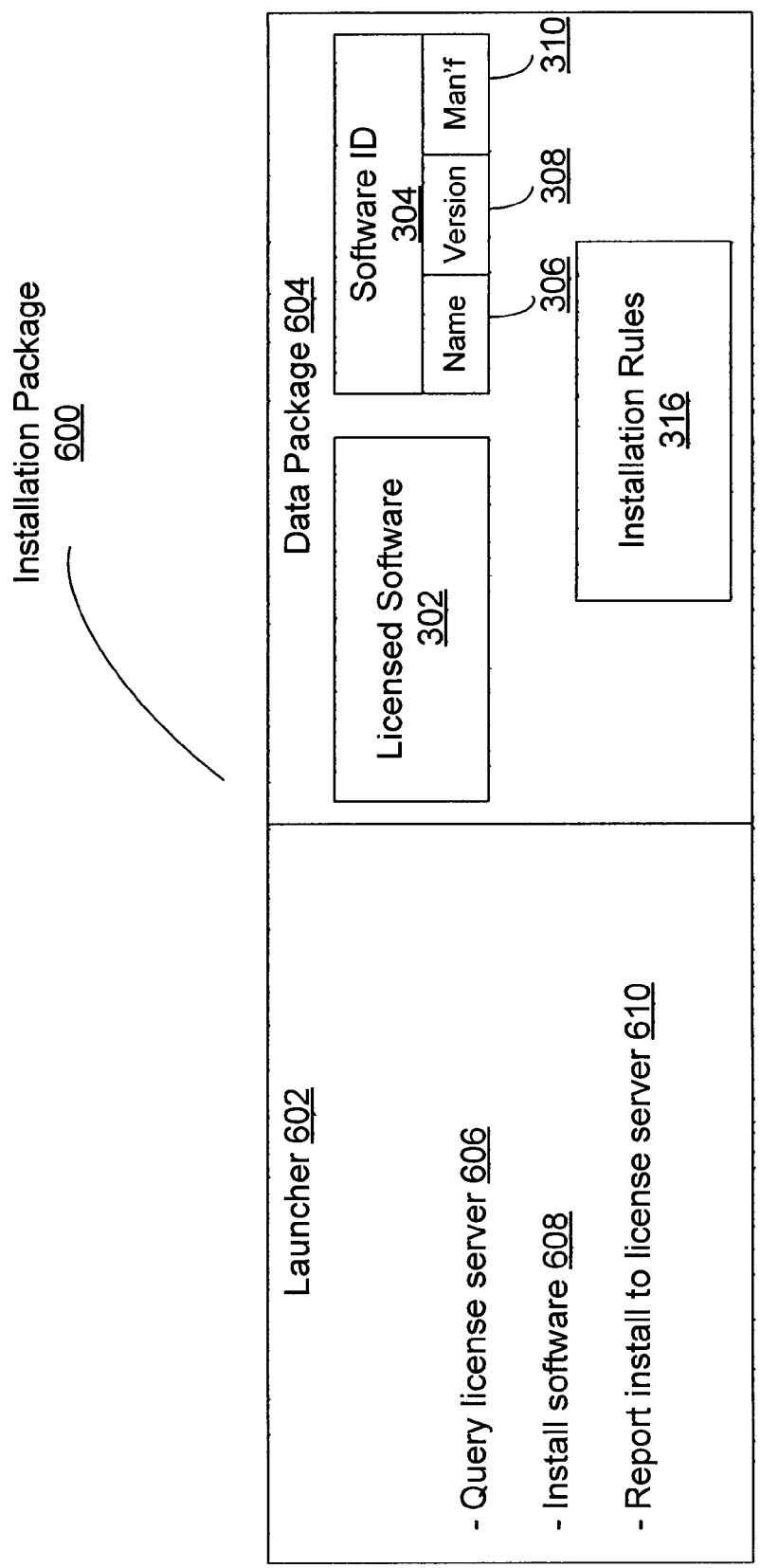
FIG. 6 illustrates a block diagram of an exemplary installation package, according to one embodiment of the present invention.

FIG. 6 illustrates a block diagram of an exemplary installation package 600, according to one embodiment of the present invention. Installation package 600 comprises two components: a launcher 602 and a data package 604. The launcher 602 interacts and operates in a number of ways on the data package 604, which may be a *.msi file. A *.msi file is a component of an installation package which contains the data to be installed. The launcher 602 might be a traditional setup.exe file, any other executable, or it may be a software installation management tool such as Microsoft Windows Installer. According to one embodiment, launcher 602 first checks with the license server 200 to determine if licenses are valid and available 606. If appropriate, the launcher then installs the licensed software application 608. Once the licensed software application is installed, the launcher 602 reports information about the installation to the license server 610. Data package 604 contains the licensed software 302, installation rules 316, and a Software ID 304 containing information about the software name 306, version 308, and manufacturer 310. This information is provided to the license server 200 by the launcher 602 at the query stage 606 and is necessary for the license server 200 to determine which software application is being installed. It is also provided to the license server at the report stage 610, in order for the license server 200 to know which license count 202 to update.

In another embodiment, additional information may be stored in data package 604 such as the date, time, etc. This information could be used by the license server 200 in determining whether any prerequisite conditions are met. For example, the license server software 402 may have the condition that the licensed software application can only be installed after a certain date. The launcher 602 would then provide a pointer to the present date to the license server 200 when checking for licenses 606. If the present date is before the pre-set date in the license server software 402, the license server 200 will provide the launcher 602 with a negative indication and installation will be terminated. Analogously, this embodiment can be used to restrict the installation on specific systems, platforms, or any other type of dependency.

An example of software that can be used to create a launcher 602 is Macrovision FlexNet Publisher. FlexNet Publisher can be used to customize the process performed by the launcher 602, and in doing so a query of the license server 606 can be added prior to installation of the software application 608. To use this software, the license server 200 might have a FlexNet Publisher license, thus granting the user the ability to use this packaging software. FlexNet Publisher might reside in the software package 302 if the package 302 contains a launcher, or it might be embedded in a launcher in an end-user system 204, such as Microsoft Windows Installer.

Figure 7:
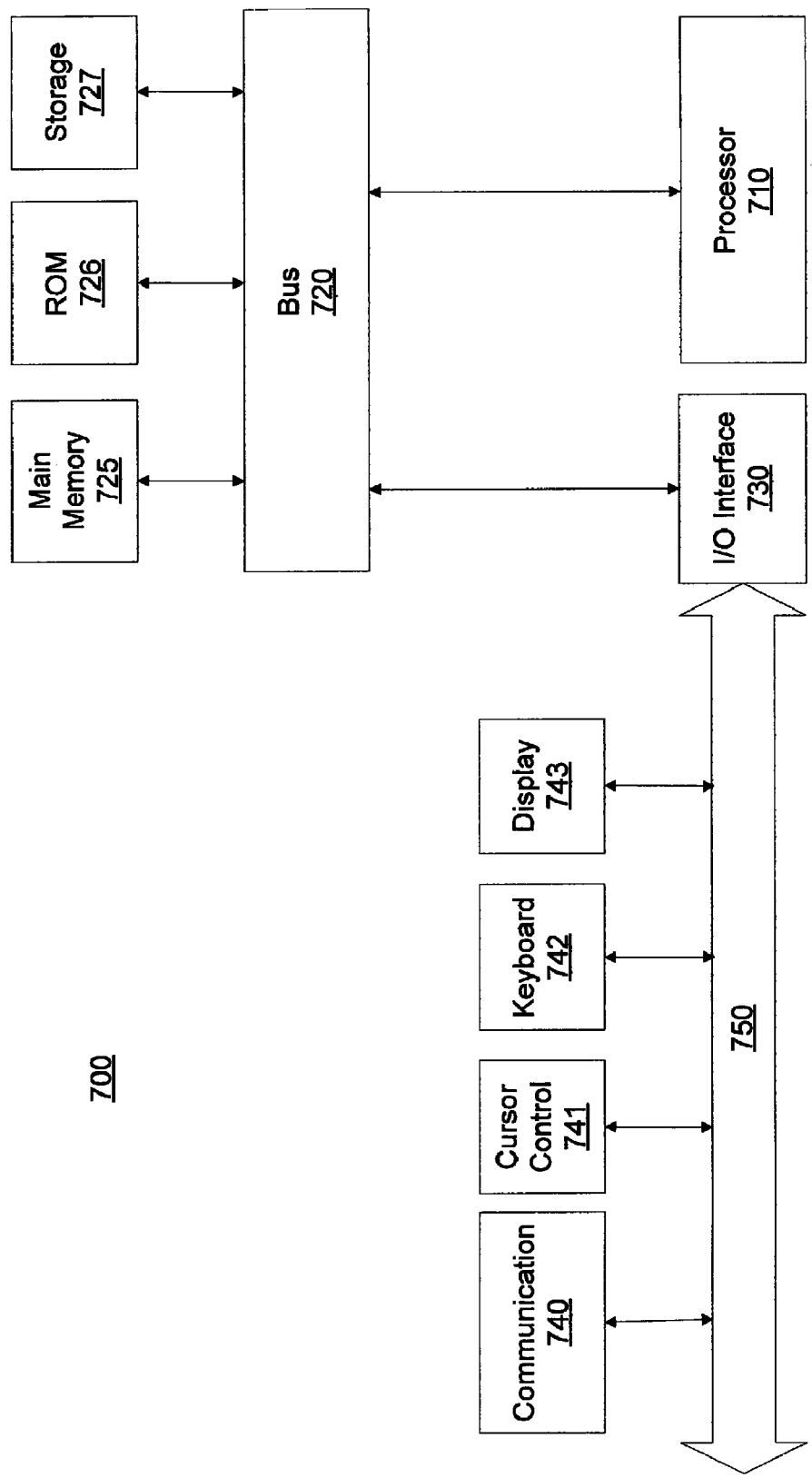
FIG. 7 illustrates an exemplary computer architecture for use with the present system and methods, according to one embodiment of the invention.

FIG. 7 illustrates an exemplary computer architecture for use with the present system, according to one embodiment of the invention. This may be the architecture of any end-user system 204 or of the license server 200. One embodiment of architecture 700 comprises a system bus 720 for communicating information, and a processor 710 coupled to bus 720 for processing information. Architecture 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Architecture 700 also may include a read only memory (ROM) and/or other static storage device 726 coupled to bus 720 for storing static information and instructions used by processor 710.

A data storage device 727 such as a magnetic disk or optical disc and its corresponding drive may also be coupled to computer system 700 for storing information and instructions. Architecture 700 can also be coupled to a second I/O bus 750 via an I/O interface 730. A plurality of I/O devices may be coupled to I/O bus 750, including a display device 743, an input device (e.g., an alphanumeric input device 742 and/or a cursor control device 741), etc.

The communication device 740 allows for access to other computers (servers or clients) via a network. The communication device 740 may comprise one or more modems, network interface cards, wireless network interfaces or other well known interface devices, such as those used for coupling to Ethernet, token ring, or other types of networks.

In an alternative embodiment, software may be bundled such that a central license covering multiple software products or a specialized license covering only a specific application is used. For example, Microsoft Office contains a number of sub-applications, such as: Excel, Word, Powerpoint, etc. A user can install Word, and thus use a single license for Word. Alternatively, a user might install Office as a package, and in doing so might use a general license for Office. In yet another embodiment, a user installing Office might use a license for Excel, Word, Powerpoint, and any other software application independently. How many of each license is available is determined by the End User License Agreement, and wholly variable depending on the licensor 100 and the enterprise 102.

A further advantage of the above embodiment is that at run-time, the software application does not need to communicate with any other system. Available use-based license enforcement systems require that systems notify a central server each time a software application is run. This allows the central server to count the number of presently running applications in order to promptly enforce the use-based license. The present disclosure does not require any such communication, as it enforces seat-based licensing and thus requires communication only at the time of installation and uninstallation.

A method and system for enforcing a seat-based licensing agreement is disclosed. Although the present methods and systems have been described with respect to specific examples and subsystems, it will be apparent to those of ordinary skill in the art that the present disclosure is not limited to these specific examples or subsystems but extends to other embodiments as well.

What is claimed is:

1. A computer-implemented method for enforcing a seat-based licensing scheme, comprising:
   updating a license count stored in a license server, wherein license server software resides on the license server, wherein the license count represents a number of software licenses available for a software application;
   querying the license server using an installation launcher residing on a user system to determine if a license is available before installing the software application, wherein the software application does not include the installation launcher; and
   installing the software application if the license is available,
   wherein prior to installing the software application the license count is decremented and after installing the software application the license count is incremented if installing the software application is not completed successfully.

2. The computer-implemented method according to claim 1 wherein said license server stores a plurality of license counts, one for each associated software application.

3. The computer-implemented method according to claim 1 wherein said software application comprises at least an identifying name, version, and manufacturer, wherein said identifying information is reported to the license server at querying the license server and updating the license count.

4. The computer-implemented method according to claim 3 wherein said license server stores said identifying information.

5. The computer-implemented method according to claim 1 wherein said license server stores restrictions on installation and installing software occurs only if said restrictions are met.

6. The computer-implemented method according to claim 5 wherein said restrictions include one or more of the following:
   date;
   time;
   system; and
   user.

7. A computer-implemented method for enforcing a seat-based licensing scheme, comprising:
   accessing a license count stored in a license server, wherein license server software resides on the license server, wherein the license count represents a number of software licenses available for a software application;
   uninstalling the software application from an end-user system using an uninstallation launcher residing on the end-user system, wherein uninstalling the software application is initiated by the end-user system, and wherein the software application does not include the uninstallation launcher; and
   updating the license count in the license server by incrementing the number of available licenses, wherein prior to uninstalling the software application the license count is incremented and after uninstalling the software application the license count is decremented if uninstalling the software application is not completed successfully.

8. The computer-implemented method according to claim 7 wherein uninstalling a software application occurs when said end-user system is not in communication with said license server.

9. The computer-implemented method according to claim 8 wherein updating the license count occurs when the end-user system reinitiates communication with said license server.

10. A seat-based licensing apparatus, comprising:
    a license server for storing a license count, wherein said license count represents the number of software licenses available; and
    an installation launcher residing on a user system for verifying that a software license is available prior to installing a software application,
    wherein said installation launcher terminates installation if no software license is available, and
    wherein the software application does not include the installation launcher, and
    wherein prior to installing the software application the license count is decremented and after installing the software application the license count is incremented if installing the software application is not completed successfully.

11. The apparatus of claim 10 wherein said license server stores a plurality of said license counts and each license count is associated with a unique software application.

12. The apparatus of claim 10 wherein said license server resides on a system on a software licensee's network.

13. A computer-implemented method for enforcing a seat-based licensing scheme, comprising:
updating a license count stored in a license server, wherein license server software resides on the license server, wherein the license count represents a number of software licenses available for a software application;
querying the license server using an installation launcher residing on a user system to determine if a license is available before installing the software application, wherein the software application does not include the installation launcher; and
installing the software application if the license is available,
wherein prior to installing the software application a placeholder is put on the license count indicating a pending installation and if installing the software application is completed successfully the placeholder is removed and the license count is decremented.

14. A seat-based licensing apparatus, comprising:
a license server for storing a license count, wherein said license count represents the number of software licenses available; and
an installation launcher residing on a user system for verifying that a software license is available prior to installing a software application,
wherein said installation launcher terminates installation if no software license is available, and
wherein the software application does not include the installation launcher, and
wherein prior to installing the software application a placeholder is put on the license count indicating a pending installation and if installing the software application is completed successfully the placeholder is removed and the license count is decremented.

* * * * *